United States Patent
Meruva et al.

(10) Patent No.: US 11,847,902 B2
(45) Date of Patent: Dec. 19, 2023

(54) GATEWAY DEVICE FOR A FIRE CONTROL SYSTEM

(71) Applicant: Honeywell International Inc., Charlotte, NC (US)

(72) Inventors: Jayaprakash Meruva, Bangalore (IN); Vipin E K, Kannur (IN); Rajesh Babu Nalukurthy, Bangalore (IN); Amit Jain, Bangalore (IN); Rich Lau, New York City, NY (US); Jesse Otis, North Haven, CT (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/365,002

(22) Filed: Jul. 1, 2021

(65) Prior Publication Data
US 2021/0327254 A1    Oct. 21, 2021

Related U.S. Application Data

(63) Continuation of application No. 16/293,305, filed on Mar. 5, 2019, now Pat. No. 11,055,983.

(51) Int. Cl.
*G08B 25/08* (2006.01)
*G08B 25/00* (2006.01)
(Continued)

(52) U.S. Cl.
CPC .............. *G08B 25/08* (2013.01); *G06F 8/61* (2013.01); *G06F 8/65* (2013.01); *G06F 9/4401* (2013.01); *G08B 25/006* (2013.01); *H04B 3/544* (2013.01)

(58) Field of Classification Search
CPC ......... G08B 25/08; G08B 25/006; G06F 8/61; G06F 8/65; G06F 9/4401; H04B 3/544
(Continued)

(56) References Cited

U.S. PATENT DOCUMENTS 6,822,555 B2    11/2004  Mansfield et al.
7,542,721 B1    6/2009   Bonner et al.
(Continued)

FOREIGN PATENT DOCUMENTS

CN      2436986        6/2001
CN    202721691        2/2013
(Continued)

OTHER PUBLICATIONS

Notifier Product Catalog, vol. 3.0, Honeywell Life Safety—Belgium, https://www.notifier.be/docs/notifierfiresystems/nl/gd/NOTIFIER%20Product%20Catalogue_V3.0.pdf, Mar. 2017, 258 pages.
(Continued)

*Primary Examiner* — Binh Kien Tieu
(74) *Attorney, Agent, or Firm* — Brooks, Cameron & Huebsch, PLLC

(57) ABSTRACT

A gateway device for a fire control system is described herein. One device includes a memory, and a processor configured to execute executable instructions stored in the memory to detect that an interface of a plurality of interfaces of the gateway device is connected to a control panel of a fire control system of a facility, select, from a plurality of communication protocol types included in the gateway device, a communication protocol type associated with the control panel to which the interface is connected, and communicate with the control panel to which the interface is connected using the selected communication protocol type.

17 Claims, 4 Drawing Sheets

(51) Int. Cl.
  *G06F 8/61*     (2018.01)
  *G06F 8/65*     (2018.01)
  *G06F 9/4401*   (2018.01)
  *H04B 3/54*     (2006.01)

(58) Field of Classification Search
  USPC .......................................................... 379/43
  See application file for complete search history.

(56) References Cited

U.S. PATENT DOCUMENTS

| | | | |
|---|---|---|---|
| 3,429,254 A1 | 4/2013 | Khan | |
| 10,051,078 B2* | 8/2018 | Burd | G06Q 50/08 |
| 10,891,851 B1 | 1/2021 | Trundle et al. | |
| 11,055,983 B2* | 7/2021 | Meruva | H04B 3/544 |
| 2001/0010716 A1* | 8/2001 | Smith | H04L 9/40 |
| | | | 379/106.05 |
| 2005/0120343 A1 | 6/2005 | Tai et al. | |
| 2009/0103695 A1* | 4/2009 | Katis | H04M 3/42221 |
| | | | 379/93.01 |
| 2010/0071053 A1* | 3/2010 | Ansari | H04L 12/2818 |
| | | | 709/206 |
| 2010/0280637 A1 | 11/2010 | Cohn et al. | |
| 2015/0326908 A1 | 11/2015 | Osminer et al. | |
| 2016/0105360 A1* | 4/2016 | Erickson | G05B 19/042 |
| | | | 370/392 |
| 2017/0054594 A1 | 2/2017 | Decenzo et al. | |
| 2018/0011461 A1* | 1/2018 | Camarasa | G06K 19/06028 |
| 2018/0191720 A1 | 7/2018 | Dawes | |
| 2022/0173934 A1* | 6/2022 | Decenzo | G05D 1/0094 |

FOREIGN PATENT DOCUMENTS

| | | |
|---|---|---|
| CN | 103372275 | 10/2013 |
| CN | 205092875 | 3/2016 |
| CN | 207249435 | 4/2018 |
| EP | 3413518 | 12/2018 |

OTHER PUBLICATIONS

First Chinese Office Action for related CN Application 202010142250. 4, dated Jan. 6, 2021 (Original & Translation; 29 pgs).

Extended European Search Report for related EP Application 20160810. 6-1206, dated Jul. 31, 2020 (9 pgs).

Communication Pursuant to Article 94(3) EPC European Examination Report for related European Application No. 20160810.6, dated Apr. 14, 2022 (7 pgs).

* cited by examiner

GATEWAY DEVICE FOR A FIRE CONTROL SYSTEM

PRIORITY INFORMATION

This Application is a Continuation of U.S. application Ser. No. 16/293,305 filed Mar. 5, 2019, the contents of which are incorporated herein by reference.

TECHNICAL FIELD

The present disclosure relates generally to a gateway device for a fire control system.

BACKGROUND

Large facilities (e.g., buildings), such as commercial facilities, office buildings, hospitals, and the like, may have fire control systems that can be used to prevent a fire from occurring in a facility, and/or to detect and/or manage a fire occurring in the facility. A fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a physical fire control panel (e.g., box) installed in the facility that can be used by a user to directly control the operation of the components of the fire control system.

A gateway device may be used by a user (e.g., maintenance technician or operator) to perform inspections, maintenance, and/or upgrades, among other operations, on a fire control system (e.g., on the components of the fire control system) of a facility. For instance, the user may connect the gateway device to the fire control panel of the fire control system, and the gateway device can use a communication protocol to communicate with the fire control panel to perform the tasks of the operation.

DETAILED DESCRIPTION

Figure 1:
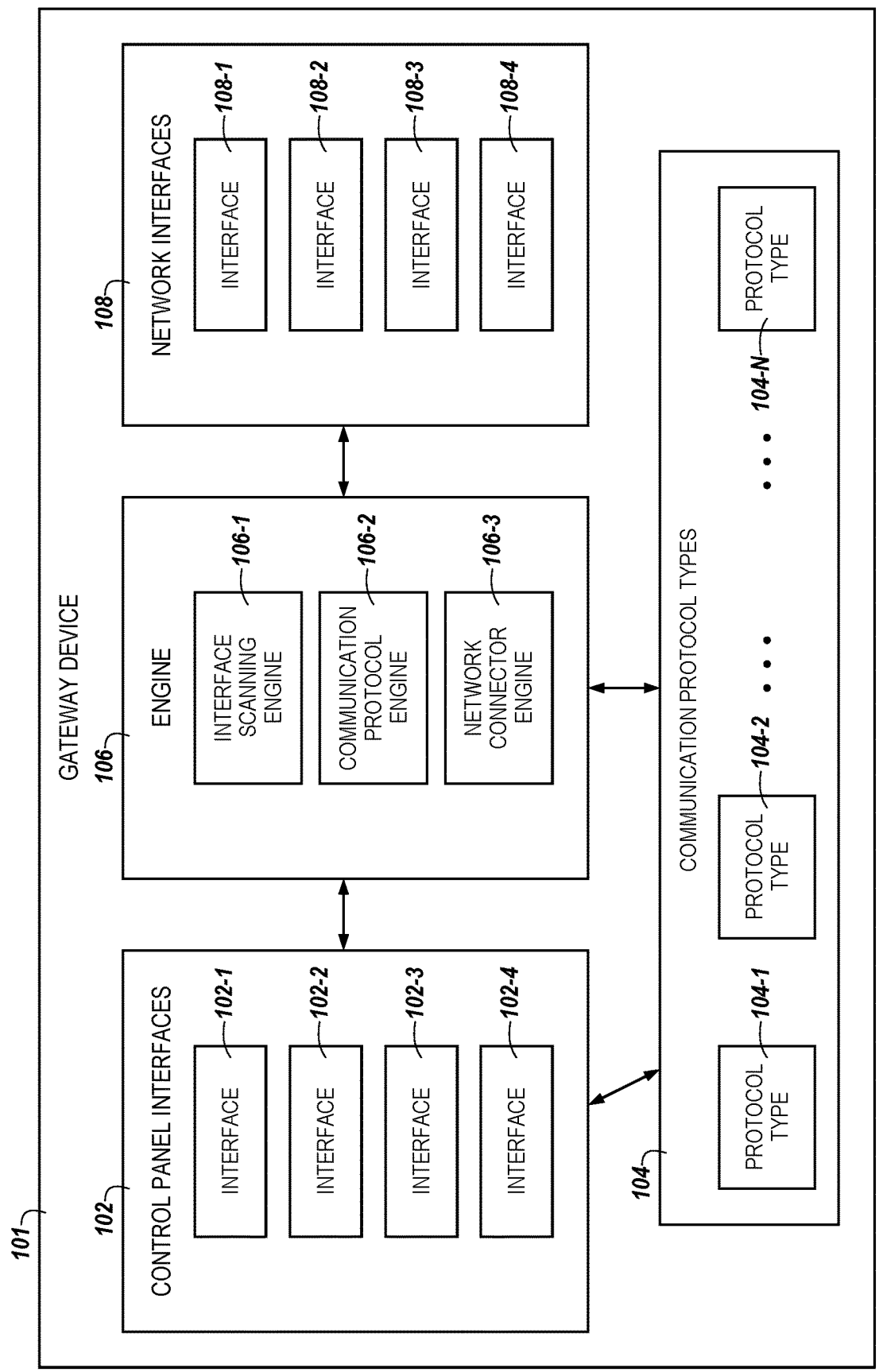
FIG. 1 illustrates an example of a gateway device for a fire control system in accordance with an embodiment of the present disclosure.

A gateway device for a fire control system is described herein. For example, an embodiment includes a memory, and a processor configured to execute executable instructions stored in the memory to detect that an interface of a plurality of interfaces of the gateway device is connected to a control panel of a fire control system of a facility, select, from a plurality of communication protocol types included in the gateway device, a communication protocol type associated with the control panel to which the interface is connected, and communicate with the control panel to which the interface is connected using the selected communication protocol type.

Previous gateway devices for fire control systems may only be usable with one specific type (e.g. brand) of fire control panel. For instance, previous gateway devices may be configured with only one specific type of communication protocol, and hence may only be capable of communicating with the type of fire control panel that supports that specific communication protocol. Further, previous gateway devices may include only one type of physical (e.g. hardware) interface, and hence may only be connectable to a fire control panel that also includes that type of interface.

As such, a user (e.g., maintenance technician or operator) who is performing operations, such as an inspections, maintenance, and/or upgrades, on fire control systems of different facilities (e.g., on the components of the fire control system) using previous gateway devices may need to carry multiple types of gateway devices to account for the many different types of fire control panels that may be present at different facilities, and in some instances may not have a gateway device that is usable with a particular fire control panel at a facility. Further, it may be difficult for the user in the field to determine which type of gateway device is usable with a particular fire control panel at a facility. These issues can result in a loss of productivity for the user, which can increase the amount of time and/or cost involved in performing such operations.

In contrast, a gateway device in accordance with the present disclosure is usable with (e.g., provide plug and play functionality for) many different types (e.g., all brands) of fire control panels. For instance, a gateway device in accordance with the present disclosure is capable of communicating with fire control panels that support many different types of communication protocols, and is connectable to fire control panels that have many different types of physical interfaces.

As such, a user who is performing operations, such as an inspections, maintenance, and/or upgrades, on fire control systems of different facilities may only need to carry one gateway device in accordance with the present disclosure for use on the many different types of fire control panels that may be present at the different facilities, and may not need to spend time determining whether that gateway device is usable with each respective fire control panel. As such, a gateway device in accordance with the present disclosure can increase the productivity of the user, which can decrease the amount of time and cost involved in performing such operations as compared to that involved with using previous gateway devices. Further, a gateway device in accordance with the present disclosure may be permanently installed and/or connected at a facility, such that it can continuously send (e.g., push) data to a centralized server for detection of anomalies or other issues.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N" as used herein, particularly with respect to reference numerals in the drawings, indicates that a number of the particular feature so designated can be included with a number of embodiments of the present disclosure. This number may be the same or different between designations.

FIG. 1 illustrates an example of a gateway device 101 for a fire control system in accordance with an embodiment of the present disclosure. The fire control system can be the fire control system of a facility (e.g., building), such as, for instance, a large facility having a large number of floors, such as a commercial facility, office building, hospital, and the like. However, embodiments of the present disclosure are not limited to a particular type of facility. Gateway device 101 may be used by a user (e.g., maintenance technician or operator) to perform inspections, maintenance, and/or upgrades, among other operations, on the fire control system (e.g., on the components of the fire control system), as will be further described herein. As an additional example, gateway device 101 may be permanently installed and/or connected at the facility, such that it can continuously send (e.g., push) data to a centralized server for detection of anomalies or other issues in the fire control system of the facility, as will be further described herein.

As shown in FIG. 1, gateway device 101 can include a plurality of control panel interfaces 102-1, 102-2, 102-3, 102-4, which may be referred to collectively herein as control panel interfaces 102. Although four control panel interfaces 102 are shown in the example illustrated in FIG. 1, embodiments of the present disclosure are not limited to a particular number of control panel interfaces.

Each respective one of the control panel interfaces 102 can be a different type of physical (e.g., hardware) interface that is connectable to (e.g., that can connect gateway device 101 to) a fire control panel (e.g., to a corresponding physical interface of the fire control panel) of a fire control system (e.g., interface 102-1 can be a first type of physical interface, interface 102-2 can be a second type of physical interface, etc.). For instance, in the example illustrated in FIG. 1, interface 102-1 can be an ethernet interface that is connectable to an ethernet interface of a fire control panel, interface 102-2 can be a universal serial bus (USB) interface that is connectable to a USB interface of a fire control panel, interface 102-3 can be a recommended standard (RS) interface, such as an RS-232 or RS-485 interface, that is connectable to an RS interface of a fire control panel, and interface 102-4 can be a transistor-transistor logic (TTL) interface that is connectable to a TTL interface of a fire control panel. However, embodiments of the present disclosure are not limited to a particular type(s) of physical interface.

As shown in FIG. 1, gateway device 101 can include (e.g., store) a plurality of communication protocol types (e.g., drivers) 104-1, 104-2, . . . 104-N, which may be referred to collectively herein as communication protocol types 104. In some embodiments, gateway device 101 can also include (e.g., store) the firmware for each respective one of the communication protocol types 104. However, embodiments of the present disclosure are not so limited (e.g., in some embodiments, gateway device 101 may not initially include or store the firmware for the communication protocol types, as will be further described herein).

Each respective one of the communication protocol types 104 can be associated with a different type (e.g., a different brand) of fire control panel. For instance, each respective one of the communication protocol types 104 (e.g., the firmware for each respective one of the communication protocol types 104) can be used by gateway device 101 to communicate with a different type of fire control panel (e.g., protocol type 104-1 can be used to communicate with a first type of fire control panel, protocol type 104-2 can be used to communicate with a second type of fire control panel, etc.).

As shown in FIG. 1, gateway device 101 can include a plurality of network interfaces 108-1, 108-2, 108-3, 108-4, which may be referred to collectively herein as network interfaces 108. Although four network interfaces 108 are shown in the example illustrated in FIG. 1, embodiments of the present disclosure are not limited to a particular number of network interfaces.

Each respective one of the network interfaces 108 can be a different type of interface that is connectable to (e.g., that can connect gateway device 101 to) a network (e.g., interface 108-1 can be a first type of network interface, interface 108-2 can be a second type of network interface, etc.). For instance, in the example illustrated in FIG. 1, interface 108-1 can be an ethernet interface, interface 108-2 can be a Wi-Fi interface, interface 108-3 can be a long-term evolution (LTE) interface, and interface 108-4 can be a public switched telephone network interface. However, embodiments of the present disclosure are not limited to a particular type(s) of network interface. An example of a network to which network interfaces 108 can connect with be further described herein (e.g., in connection with FIG. 2).

As shown in FIG. 1, gateway device can include an interface scanning engine 106-1, a communication protocol engine 106-2, and a network connector engine 106-3, which may be referred to collectively herein as engine 106. Upon a powering on (e.g., a powering up and/or restart) of gateway device 101, engine 106 (e.g., interface scanning engine 106-1) can detect that one of the plurality of control panel interfaces 102 is connected to a fire control panel (e.g., to a corresponding physical interface of the fire control panel) of a fire control system of a facility. An example of a fire control panel to which the control panel interface can be connected will be further described herein (e.g., in connection with FIG. 2).

Engine 106 can detect that one of the plurality of control panel interfaces 102 is connected to the fire control panel by, for instance, sequentially (e.g., one at a time) scanning each respective one of the plurality of control panel interfaces 102 for connectivity to a fire control panel, until a connectivity of one of the control panel interfaces is detected. The order in which each respective one of the plurality of control panel interfaces 102 is scanned can be based on a priority associated with each respective interface, such as, for instance, a default priority configured for gateway device 101.

As an example in which interface 102-1 is an ethernet interface, interface 102-2 is a USB interface, interface 102-3 is an RS interface, and interface 102-4 is a TTL interface, the default priority order can be interface 102-1, 102-2, 102-3, 102-4 (e.g., interface 102-1 has the highest priority, interface 102-2 has the next highest priority, interface 102-3 has the next highest priority after interface 102-2, and interface 102-4 has the lowest priority). In such an example, engine 106 would first scan interface 102-1 for connectivity. If connectivity of interface 102-1 to a fire control panel is detected, the scan would stop. If, however, no connectivity is detected for interface 102-1, engine 106 would then scan interface 102-2 for connectivity. If connectivity of interface 102-2 to a fire control panel is detected, the scan would stop. If however, no connectivity is detected for interface 102-2, the scan would continue in an analogous manner for interfaces 102-3 and 102-4, until a connectivity is detected.

Also upon the powering on of gateway device 101 (e.g., concurrently with the detection that one of the plurality of control panel interfaces 102 is connected to a fire control panel), engine 106 (e.g., network connector engine 106-3) can detect that one of the plurality of network interfaces 108 is connected to a network. Engine 106 can detect that one of the plurality of network interfaces 108 is connected to the network by, for instance, sequentially (e.g., one at a time) scanning each respective one of the plurality of network interfaces 108 for connectivity to a network, until a connectivity of one of the control panel interfaces is detected, in a manner analogous to the scanning of control panel interfaces 102 previously described herein.

Upon detecting that one of the plurality of control panel interfaces 102 is connected to a fire control panel, engine 106 (e.g., communication protocol engine 106-2) can select, from the plurality of communication protocol types 104, the communication protocol type associated with the fire control panel (e.g., with the type of fire control panel) to which the control panel interface is connected. For instance, engine 106 can detect the type (e.g., brand) of the fire control panel to which the control panel interface is connected, and select, from the plurality of communication protocol types 104, the communication protocol type associated with the detected control panel type as the communication protocol type associated with the connected fire control panel.

As an example, engine 106 can initiate a sequential handshake procedure with the fire control panel to which the control panel interface is connected using each respective one of the plurality of communication protocol types 104 (e.g., initiate a handshake procedure using a first one of the communication protocol types 104, then initiate a handshake procedure using a second one of the communication protocol types 104, etc.), until the connected fire control panel responds to one of the communication protocol types. Engine 106 can then select the communication protocol type to which the connected fire control panel responds as the communication protocol type associated with the connected fire control panel.

Engine 106 can initiate the sequential handshake procedure, for instance, by exchanging initial handshake sequence logic associated with each respective one of the plurality of communication protocol types 104 with the connected fire control panel. This logic can be separate from the actual firmware for the communication protocol types. As such, although the firmware for the communication protocol types may, in some embodiments, be stored in gateway device 101 (as previously described herein), it is not necessary to do so, as will be further described herein.

Upon detecting that one of the plurality of control panel interfaces 102 is connected to the fire control panel and selecting the communication protocol type associated with the connected fire control panel, gateway device 101 can provide an indication to a user of gateway device 101. The indication can be, for instance, a blinking light (e.g., LED). However, embodiments of the present disclosure are not limited to a particular type of indication.

Upon selecting the communication protocol type associated with the connected fire control panel, engine 106 can communicate (e.g., via the control panel interface 102 that is connected to the fire control panel) with the control panel using the selected communication protocol type. For instance, engine 106 can communicate with the connected fire control panel using the firmware for the selected communication protocol type.

In some embodiments, the firmware for the selected communication protocol type may be included (e.g., stored) in gateway device 101, as previously described herein. In such an embodiment, engine 106 can load and use this firmware to communicate with the connected fire control panel.

In some embodiments, the firmware for the selected communication protocol type may not be initially included or stored in gateway device 101. In such an embodiment, engine 106 (e.g., network connector engine 106-3) can receive the firmware for the selected communication protocol type from the network to which gateway device 101 is connected (e.g., via the one of the plurality of network interfaces 108 connected to the network). For instance, engine 106 can download and install the firmware from the network. Engine 106 can then use the received (e.g., downloaded) firmware to communicate with the connected fire control panel. Gateway device 101 may also store the received firmware for future use (e.g., future communications).

The communication with the connected fire control panel can occur as part of an inspection, maintenance, or upgrade operation being performed on the fire control system by a user (e.g., a maintenance technician or operator) of gateway device 101. For example, the communication with the connected fire control panel can include receiving, from the control panel, data associated with the fire control system, such as, for instance, operational data associated with the components of the fire control system. Examples of such fire control system components will be further described herein (e.g., in connection with FIG. 2).

Further, engine 106 (e.g., network connector engine 106-3) can send (e.g., transmit) the data received from the connected fire control panel to the network to which gateway device 101 is connected (e.g., via the one of the plurality of network interfaces 108 connected to the network). For instance, engine 106 can upload the data to the network.

Figure 2:
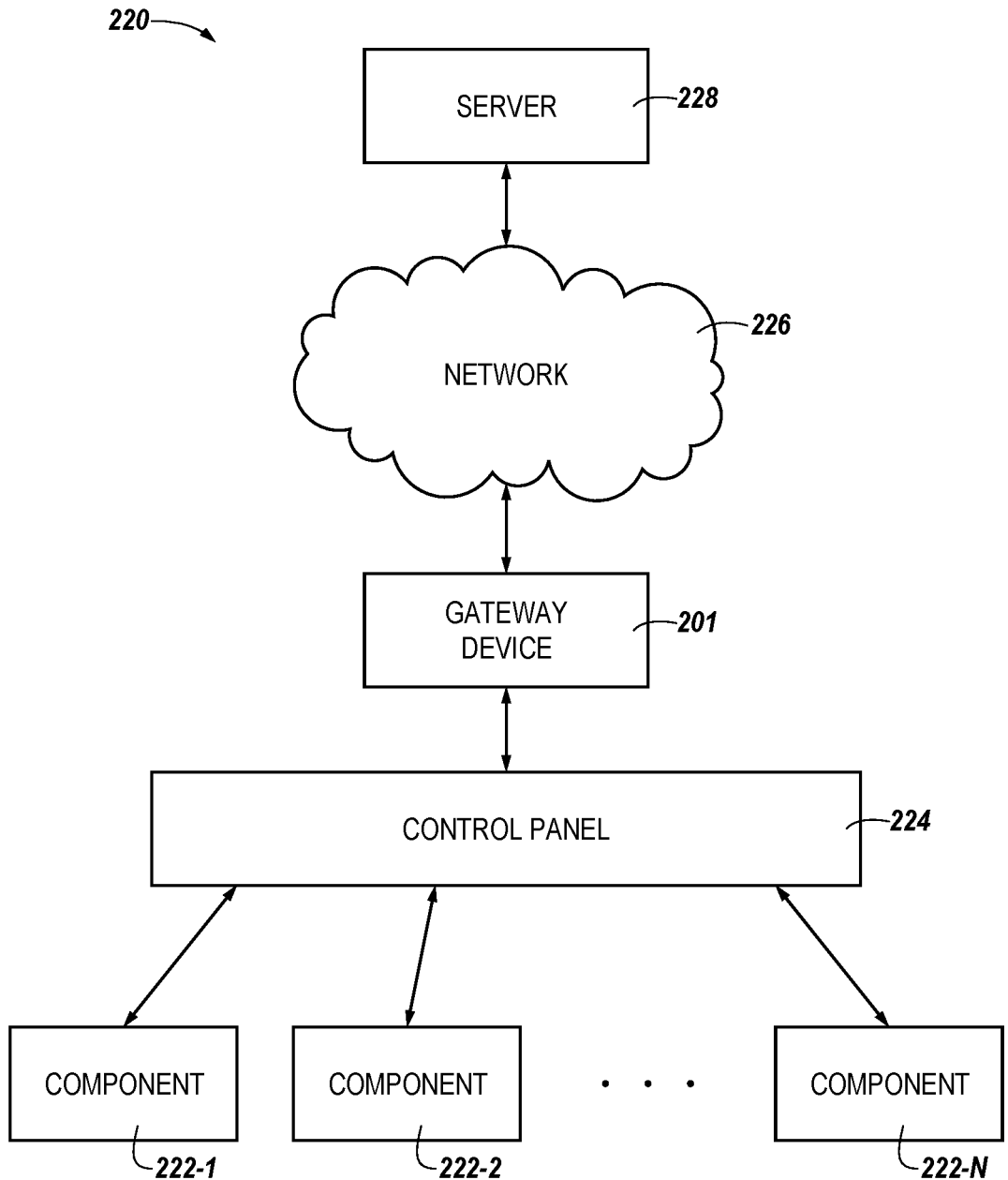
FIG. 2 illustrates an example of a fire control system in accordance with an embodiment of the present disclosure.

FIG. 2 illustrates an example of a fire control system 220 in accordance with an embodiment of the present disclosure. Fire control system 220 can be, for instance, the fire control system previously described in connection with FIG. 1. For example, as shown in FIG. 2, fire control system 220 can include gateway device 201, which can be gateway device 101 previously described in connection with FIG. 1.

As shown in FIG. 2, fire control system 220 can include a plurality of components 222-1, 222-2, . . . , 222-N located throughout a facility (e.g., on different floors of the facility) that can be used to detect and/or manage a fire occurring in the facility, and/or to prevent a fire from occurring in the facility. For example, components 222-1, 222-2, ..., 222-N may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

As shown in FIG. 2, fire control system 220 can include a control panel (e.g., fire control panel) 224. Control panel 224 can be any different type (e.g., brand) of fire control panel. For instance, control panel 224 can be any different type of physical control panel, such as a control box, installed in the facility.

Control panel 224 can be used by a user to monitor and/or control components 222-1, 222-2, ..., 222-N. For instance, the user can use control panel 224 to directly control the operation of (e.g., actions performed by) components 222-1, 222-2, ..., 222-N. Further, control panel 224 can receive (e.g., collect) data, such as, for instance, real-time operational data, associated with components 222-1, 222-2, ..., 222-N. For instance, control panel 224 can receive the data directly from components 222-1, 222-2, ..., 222-N. Such data can include, for instance, current operational statuses, operational states, and/or properties of components 222-1, 222-2, ..., 222-N.

Gateway device 201 can be used by a user (e.g., maintenance technician or operator) to perform inspections, maintenance, and/or upgrades, among other operations, on components 222-1, 222-2, ..., 222-N. For example, as previously described herein (e.g., in connection with FIG. 1), gateway device 201 can be connected to control panel 224, and can communicate with control panel 224 to receive the data associated with components 222-1, 222-2, ..., 222-N collected by control panel 224. For instance, gateway device 201 can detect connectivity to control panel 224, select the communication protocol type associated with control panel 224, and communicate with control panel 224 using the selected communication protocol type, as previously described herein (e.g., in connection with FIG. 1). As an additional example, gateway device 201 may be permanently installed and/or connected at the facility, such that it can continuously send (e.g., push) the data collected by control panel 224 to a centralized server (e.g., server 228 illustrated in FIG. 2) for detection of anomalies or other issues in the fire control system of the facility.

As shown in FIG. 2, fire control system 220 can include a server 228. Server 228 can be located remotely from the facility and, in some embodiments, can be part of and/or coupled to a computing device that is part of a centralized management platform.

Gateway device 201 can communicate with server 228 via network 226, as illustrated in FIG. 2. For example, as previously described herein (e.g., in connection with FIG. 1), gateway device 201 can detect connectivity to network 226, and send (e.g., transmit and/or upload) the data associated with components 222-1, 222-2, ..., 222-N to server 228 via network 226. Further, gateway device 201 can receive (e.g., download and/or install) firmware for the selected communication protocol type associated with control panel 224 from server 228 via network 226, as previously described herein (e.g., in connection with FIG. 1).

Network 226 can be a network relationship through which gateway device 201 and sever 228 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 226 can include a number of servers that receive information from, and transmit information to, gateway device 201 and server 228 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Figure 3:
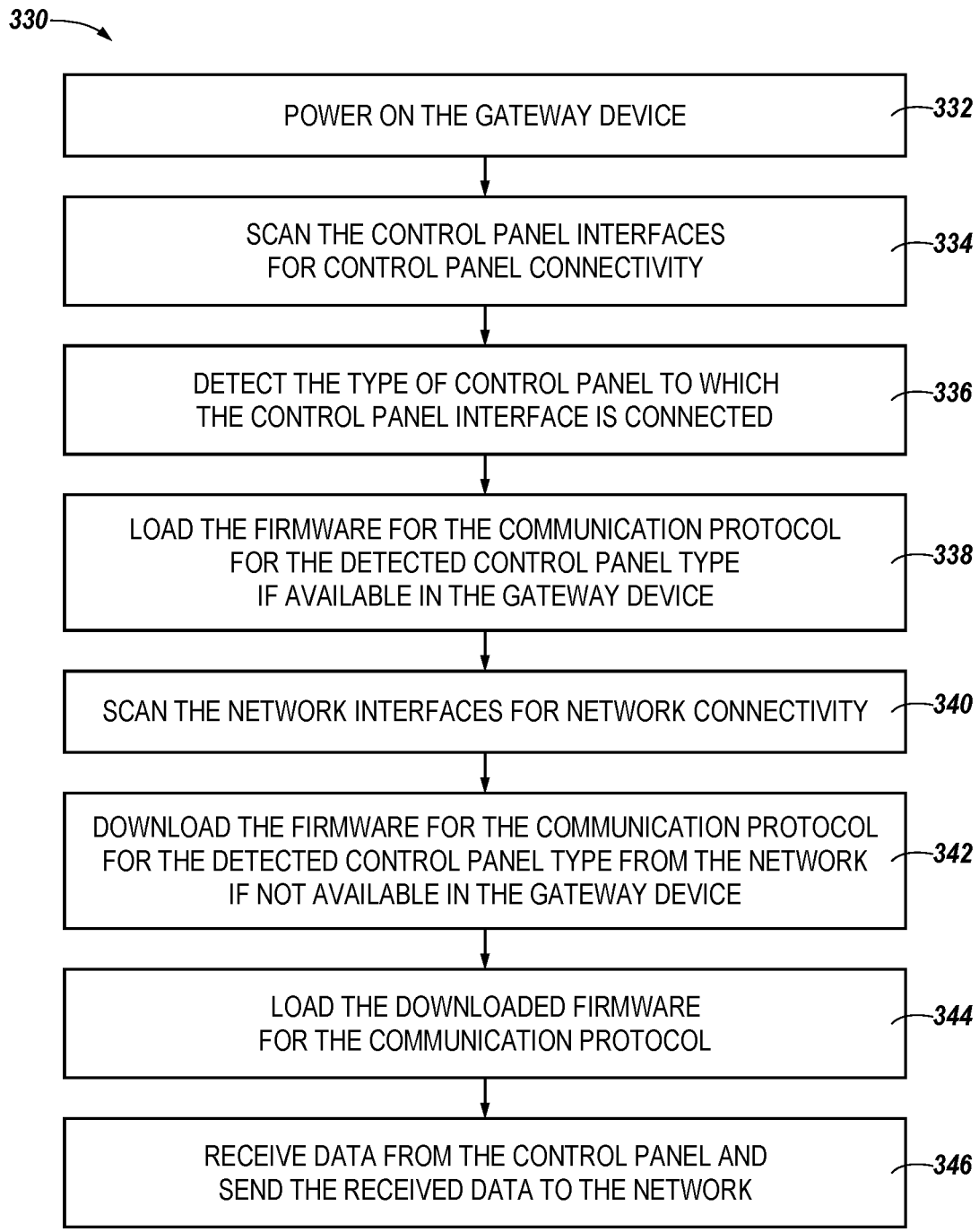
FIG. 3 illustrates an example of a method of operating a gateway device for a fire control system in accordance with an embodiment of the present disclosure.

FIG. 3 illustrates an example of a method 330 of operating a gateway device for a fire control system in accordance with an embodiment of the present disclosure. The gateway device can be, for instance, gateway device 101 and/or gateway device 201 previously described herein in connection with FIGS. 1 and 2, respectively.

At block 332, method 330 includes powering on the gateway device. Powering on the gateway device can include, for instance, powering up and/or restarting the gateway device.

At block 334, method 330 includes scanning the control panel interfaces of the gateway device for connectivity to a control panel (e.g., a fire control panel). Such a scan can be a sequential scan used to detect that the gateway device is connected to a control panel, as previously described herein (e.g., in connection with FIG. 1).

At block 336, method 330 includes detecting the type (e.g., brand) of control panel to which the control panel interface is connected. The type of control panel can be detected by, for instance, initiating a sequential handshake procedure with the control panel using each respective one of a plurality of communication protocol types 104 until the control panel responds to one of the communication protocol types, as previously described herein (e.g., in connection with FIG. 1). If the firmware for the communication protocol type to which the control panel responds is available (e.g., stored) in the gateway device, the firmware can be loaded at block 338.

At block 340, method 330 includes scanning the network interfaces of the gateway device for network connectivity. Such a scan can be a sequential scan of each respective network interfaces for connectivity to a network, as previously described herein (e.g., in connection with FIG. 1). If the firmware for the communication protocol type to which the control panel responds is not available in the gateway device, the firmware can be downloaded from the network at block 342, and loaded at block 344.

At block 346, method 330 includes receiving data from the control panel, and sending the received data to the network. The data can be data associated with components of the fire control system, as previously described herein, and can be received as part of a communication with the control panel using the firmware for the communication protocol type to which the control panel response, as previously described herein.

Figure 4:
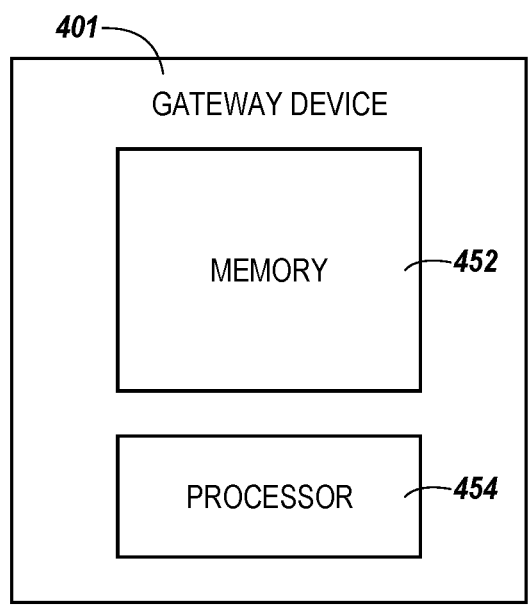
FIG. 4 illustrates an example of a gateway device for a fire control system in accordance with an embodiment of the present disclosure.

FIG. 4 illustrates an example of a gateway device 401 for a fire control system in accordance with an embodiment of the present disclosure. Gateway device 401 can be, for instance, gateway device 101 and/or gateway device 201 previously described herein in connection with FIGS. 1 and 2, respectively.

As shown in FIG. 4, gateway device 401 can include a processor 454 and a memory 452. Memory 452 can be any type of storage medium that can be accessed by processor 454 to perform various examples of the present disclosure. For example, memory 452 can be a non-transitory computer readable medium having computer readable instructions (e.g., computer program instructions) stored thereon that are executable by processor 454 to perform various examples of the present disclosure. That is, processor 454 can execute the executable instructions stored in memory 452 to perform various examples in accordance with the present disclosure.

Memory 452 can be volatile or nonvolatile memory. Memory 452 can also be removable (e.g., portable) memory, or non-removable (e.g., internal) memory. For example, memory 452 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 452 is illustrated as being located in gateway device 401, embodiments of the present disclosure are not so limited. For example, memory 452 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A gateway device for a fire control system, comprising:
    a plurality of control panel interfaces;
    a plurality of network interfaces, wherein each respective one of the plurality of network interfaces is a different type of network interface configured to connect the gateway device to a different type of network;
    a memory; and
    a processor configured to execute executable instructions stored in the memory to:
        detect that a control panel interface of the plurality of control panel interfaces is connected to a control panel of a fire control system of a facility;
        select, from a plurality of communication protocol types included in the gateway device, a communication protocol type associated with the control panel to which the control panel interface is connected;
        detect that one of the plurality of network interfaces is connected to a network by:
            sequentially scanning each respective one of the plurality of network interfaces for connectivity to a network until connectivity of one of the plurality of network interfaces to a network is detected; and
            stopping the sequential scan of the plurality of network interfaces for connectivity upon detecting the connectivity of the one of the plurality of network interfaces to the network; and
        send, to the network to which the gateway device is connected via the one of the plurality of network interfaces, data associated with the fire control system received from the control panel to which the control panel interface is connected.

2. The gateway device of claim 1, wherein the processor is configured to execute the instructions to receive the data from the control panel to which the control panel interface is connected using the selected communication protocol type.

3. The gateway device of claim 1, wherein the processor is configured to send the data to the network using a network connector engine.

4. The gateway device of claim 1, wherein:
    the gateway device includes firmware for the selected communication protocol type; and
    the processor is configured to execute the instructions to receive the data from the control panel to which the control panel interface is connected using the firmware.

5. The gateway device of claim 1, wherein the processor is configured to execute the instructions to detect that the control panel interface is connected to the control panel of the fire control system by scanning each respective one of the plurality of control panel interfaces for connectivity to the control panel until the connectivity is detected, wherein an order in which each respective one of the plurality of control panel interfaces are scanned is based on a priority associated with each respective one of the plurality of control panel interfaces.

6. A method of operating a gateway device for a fire control system, comprising:
    detecting, by the gateway device, that a control panel interface of a plurality of control panel interfaces of the gateway device is connected to a control panel of a fire control system of a facility;
    selecting, by the gateway device from a plurality of communication protocol types included in the gateway device, a communication protocol type associated with the control panel to which the control panel interface is connected;

receiving, by the gateway device from the control panel to which the control panel interface is connected using the selected communication protocol type, data associated with the fire control system;

detecting, by the gateway device, that one of a plurality of network interfaces of the gateway device is connected to a network by:

sequentially scanning each respective one of the plurality of network interfaces for connectivity to a network until connectivity of one of the plurality of network interfaces to a network is detected; and stopping the sequential scan of the plurality of network interfaces for connectivity upon detecting the connectivity of the one of the plurality of network interfaces to the network;

wherein each respective one of the plurality of network interfaces is a different type of network interface configured to connect the gateway device to a different type of network; and sending, by the gateway device to the network to which the gateway device is connected via the one of a plurality of network interfaces of the gateway device, the received data.

7. The method of claim 6, wherein the method includes:

receiving, by the gateway device, firmware for the selected communication protocol type; and receiving, by the gateway device, the data from the control panel using the received firmware.

8. The method of claim 7, wherein receiving the firmware for the selected communication protocol type includes downloading, by the gateway device, the firmware from a server via the network.

9. The method of claim 6, wherein the method includes providing, by the gateway device, an indication of the selected communication protocol type.

10. The method of claim 6, wherein the data associated with the fire control system includes operational data associated with components of the fire control system.

11. The method of claim 6, wherein the gateway device is permanently installed at the facility.

12. The method of claim 6, wherein the method includes detecting, by the gateway device, a brand of the control panel to which the control panel interface is connected.

13. A gateway device for a fire control system, comprising:

a plurality of control panel interfaces, wherein each respective one of the plurality of control panel interfaces is a different type of control panel interface that is connectable to a control panel of a fire control system;

a plurality of network interfaces, wherein each respective one of the plurality of network interfaces is a different type of network interface configured to connect the gateway device to a different type of network;

a plurality of communication protocol types; and an interface scanning engine configured to detect that one of the plurality of control panel interfaces is connected to a control panel of a fire control system of a facility;

a communication protocol engine configured to select, from the plurality of communication protocol types, a communication protocol type associated with the control panel to which the one of the plurality of control panel interfaces is connected; and a network connector engine configured to:

detect that one of the plurality of network interfaces is connected to a network by:

sequentially scanning each respective one of the plurality of network interfaces for connectivity to a network until connectivity of one of the plurality of network interfaces to a network is detected; and stopping the sequential scan of the plurality of network interfaces for connectivity upon detecting the connectivity of the one of the plurality of network interfaces to the network; and send, to the network to which the gateway device is connected via the one of the plurality of network interfaces, data associated with the fire control system received from the control panel to which the one of the plurality of control panel interfaces is connected.

14. The gateway device of claim 13, wherein the network connector engine is configured to detect that the one of the plurality of network interfaces is connected to the network upon a powering on of the gateway device.

15. The gateway device of claim 13, wherein the plurality of network interfaces includes four different types of network interfaces.

16. The gateway device of claim 13, wherein the plurality of control panel interfaces include four different types of control panel interfaces.

17. The gateway device of claim 13, wherein the network connector engine is configured to continuously send the data received from the control panel to the network.

* * * * *